United States Patent [19]

Sato et al.

[11] Patent Number: 5,103,948
[45] Date of Patent: Apr. 14, 1992

[54] METHOD OF CONTROLLING SPEED CHANGING OPERATION FOR CONSTRUCTION MACHINE

[75] Inventors: Takayuki Sato; Mikio Kawaguchi, both of Kanagawa, Japan

[73] Assignee: Kabushiki Kaisha Komatsu Seisakusho, Tokyo, Japan

[21] Appl. No.: 651,367

[22] Filed: Jun. 18, 1991

[30] Foreign Application Priority Data

Jun. 20, 1989 [JP] Japan .................................. 1-155730

[51] Int. Cl.$^5$ ....................... F16D 21/02; B60K 41/02
[52] U.S. Cl. ................................. 192/0.08; 192/3.55;
192/3.57; 192/0.092; 364/424.1; 180/6.48
[58] Field of Search ................. 192/0.076, 0.08, 0.092,
192/0.098, 3.55, 3.57, 3.58; 180/6.48, 6.5;
364/424.1

[56] References Cited

U.S. PATENT DOCUMENTS

| | | | |
|---|---|---|---|
| 3,348,644 | 10/1967 | Hilpert | 192/3.57 X |
| 3,438,469 | 4/1969 | Hilpert | 192/3.57 |
| 3,645,366 | 2/1972 | Numazawa et al. | 192/0.08 |
| 4,324,322 | 4/1982 | Sideud | 192/0.092 |
| 4,677,880 | 7/1987 | Hattori et al. | 192/0.092 X |
| 4,732,246 | 3/1988 | Tateno et al. | 192/0.08 X |
| 4,768,636 | 9/1988 | Ito et al. | 192/0.08 |
| 4,785,917 | 11/1988 | Tateno et al. | 192/0.08 |
| 4,792,012 | 12/1988 | Morisawa et al. | 192/3.58 X |

FOREIGN PATENT DOCUMENTS 60-58047 12/1985 Japan .
61-135831 6/1986 Japan .

*Primary Examiner*—Leslie A. Braun
*Assistant Examiner*—Nicholas Whitelaw
*Attorney, Agent, or Firm*—Diller, Ramik & Wight

[57] ABSTRACT

A method of controlling a speed changing operation wherein the method is preferably employable for a caterpillar drive type construction machine including a direct transmission is disclosed. When a shift-up speed changing operation is to be performed, the method is practiced by way of the steps, i.e., a step of releasing leftward and rightward steering clutches from the operatively engaged state thereof, a step of increasing an engine speed, a step of releasing a main clutch from the operatively engaged state thereof, a step of releasing the dog clutch which has selected the present speed stage from the meshing engagement thereof, a step of bringing the main clutch in the operatively engaged state, a step of detecting the rotational speed of an output shaft in the transmission, a step of setting a target engine speed for realizing synchronous meshing engagement of a dog clutch for a next speed stage based on the rotational speed of the output shaft and the number of gear teeth to be brought in meshing engagement in the transmission when it is assumed that the next speed stage has been selected, a step of rotating the engine at the target engine speed, a step of bringing the dog clutch for the next speed stage in the operatively engaged state thereof, a step of bringing the leftward and rightward steering clutches in the operatively engaged state, and a step of rotating the engine at the engine speed which has been designates by actuating a throttle lever. With such construction, the method of the present invention assures that the shift-up speed changing operation can smoothly be performed without any necessity for interrupting movement of the caterpillar drive type construction machine.

3 Claims, 5 Drawing Sheets

METHOD OF CONTROLLING SPEED CHANGING OPERATION FOR CONSTRUCTION MACHINE

TECHNICAL FIELD

The present invention relates to a method of controlling a speed changing operation wherein the method is preferably employable for a caterpillar drive type construction machine including a direct transmission.

BACKGROUND ART

A caterpillar drive type construction machine such as a bulldozer or the like including a direct transmission is constructed such that power generated in an engine is transmitted to left-hand and right-hand caterpillars via a main clutch, the direct transmission and leftward and rightward steering clutches.

The direct transmission has a so-called dog clutch incorporated therein so as to select individual speed stage. When a speed changing operation is to be performed in the direct transmission, first, the main clutch is released from the operatively engaged state thereof to operatively disconnect the transmission from the engine. Thereafter, a speed changing lever is actuated such that a dog clutch corresponding to the speed stage which has been presently selected is released from the operatively engaged state thereof and another dog clutch corresponding to a speed stage to be subsequently selected is brought in the operatively engaged state thereof.

As is well known, the caterpillar drive type construction machine is generally subjected to a large magnitude of resistance against its movement. For this reason, once the main clutch is released from the operatively engaged state to perform a speed changing operation, movement of the construction machine is interrupted within a short period of time. Accordingly, with a conventional construction machine of the foregoing type, there arises such a malfunction that movement of the construction machine is unavoidably interrupted at every time when a speed changing operation is performed.

In a case where a speed changing operation is performed to shift to a low speed stage (shift-down speed changing operation), the construction machine is not required to move at a high speed. Thus, there does not arise any malfunction even when there appears an occasion that movement of the construction machine is temporarily interrupted.

On the contrary, a speed changing operation for shifting to a high speed stage (shift-up speed changing operation) is usually performed in a case where the construction machine is required to move at a high speed. However, interruption of movement of the construction machine during the speed changing operation degrades workability of the construction machine. Additionally, the phenomenon that movement of the construction machine is interrupted during the shift-up speed changing operation leads to the result that movement feeling to be received by an operator is deteriorated remarkably.

The present invention has been made with the foregoing background in mind.

Therefore, an object of the present invention is to provide a method of controlling a speed changing operation wherein particularly, a shift-up speed changing operation can smoothly be performed without an occurrence of interruption of movement of a construction machine, without any necessity for manually actuating a main clutch and without any generation of noisy sound due to incorrect meshing engagement of a dog clutch during the speed changing operation.

DISCLOSURE OF THE INVENTION

To accomplish the above object, the present invention provides a method of controlling a speed changing operation, the method being preferably employable for a construction machine including a direct transmission adapted to select a speed stage by actuating a dog clutch as well as left-hand and right-hand caterpillars to which power generated in an engine is transmitted via a main clutch, the direct transmission and leftward and rightward steering clutches, wherein the method is practiced by way of the following steps particularly when a shift-up speed changing operation is to be performed;

a step of releasing the leftward and rightward steering clutches from the operatively engaged state thereof, a step of increasing an engine speed, a step of releasing the main clutch from the operatively engaged state thereof, a step of releasing the dog clutch which has selected the present speed stage from the meshing engagement thereof, a step of bringing the main clutch in the operatively engaged state, a step of detecting the rotational speed of an output shaft in the transmission, a step of setting a target engine speed for realizing synchronous operative engagement with a dog clutch for a next speed stage based on the rotational speed of the output shaft and the number of gear teeth to be brought in meshing engagement when it is assumed that the next speed stage has been selected, a step of rotating the engine at the target engine speed, a step of bringing the dog clutch for the next speed stage in the operatively engaged state thereof, a step of bringing the leftward and rightward steering clutches in the operatively engaged state, and a step of rotating the engine at the engine speed which has been designated by actuating a throttle lever.

With the method of the present invention, since leftward and rightward steering clutches are released from the operative state when a shift-up speed changing operation is to be performed, a magnitude of running resistance to be borne by the construction machine can be reduced when the foregoing speed changing operation is performed. Thus, the shift-up speed changing operation can be accomplished without any necessity for interrupting movement of the construction machine, resulting in workability of the construction machine and movement feeling to be received by an operator being improved substantially.

In addition, since a dog clutch for a next speed stage is synchronously brought in meshing engagement, the shift-up speed changing operation can smoothly be performed without generation of noisy sound due to incorrect meshing engagement with dog clutch.

BEST MODE FOR CARRYING OUT THE INVENTION

Now, the present invention will be described in detail hereinafter with reference to the accompanying drawings which illustrate a preferred embodiment of the present invention.

Figure 1:
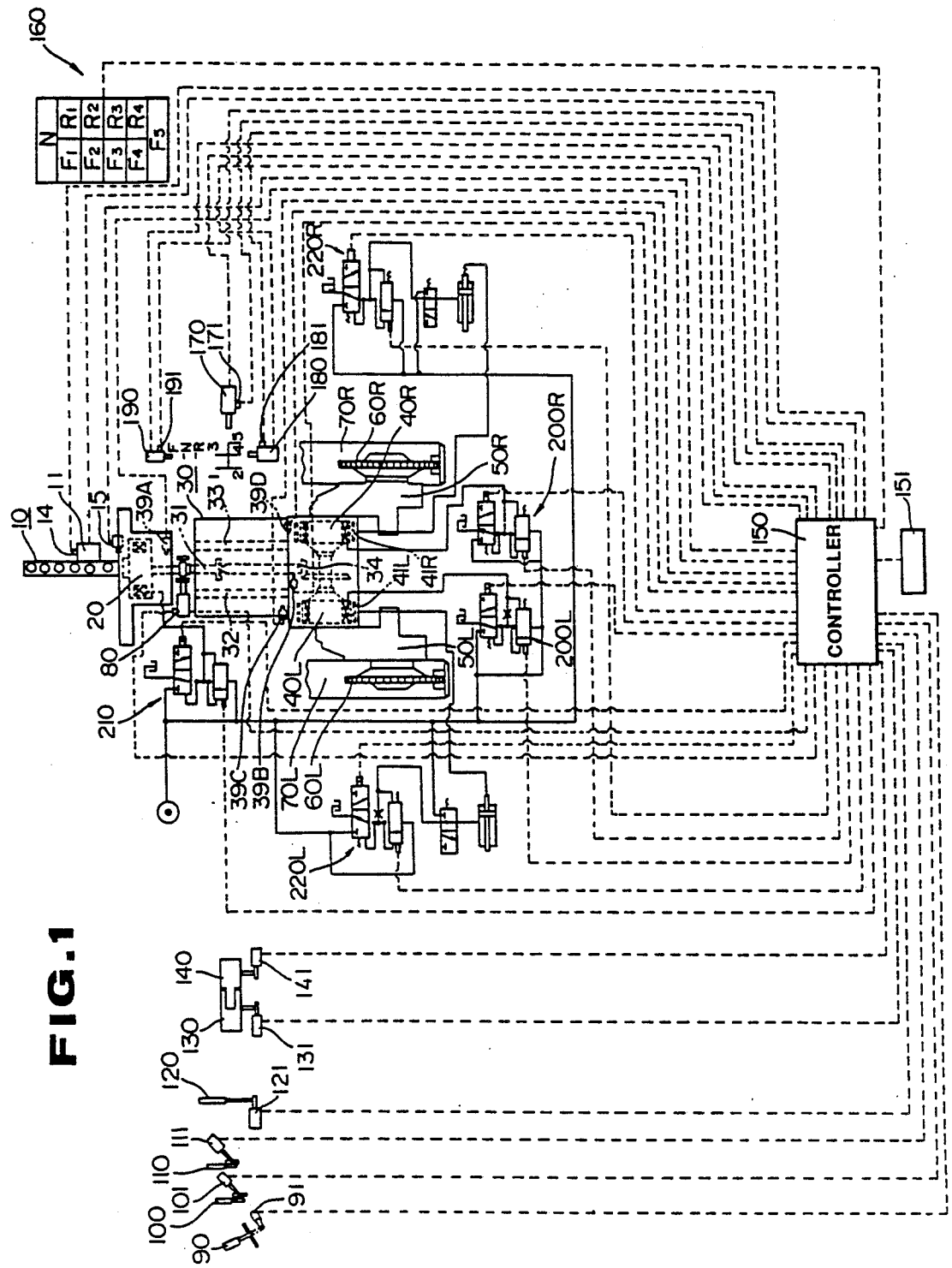
FIG. 1 is an illustrative view which schematically shows by way of example the structure of an apparatus for controlling a speed changing operation wherein the apparatus is employed for practicing a method of controlling a speed changing operation in accordance with an embodiment of the present invention.

A method of controlling a speed changing operation in accordance with the embodiment of the present invention is preferably employable for a caterpillar drive type construction machine such as a bulldozer or the like including a direct transmission, and the method of the present invention is practiced by using an apparatus for controlling a speed changing operation wherein the apparatus is illustrated by way of example in FIG. 1.

Referring to FIG. 1, an engine 10 is mounted on the caterpillar drive type construction machine such as bulldozer or the like, and a power generated in the engine 10 is transmitted to caterpillars 70L and 70R via a main clutch 20, a direct transmission 30, leftward/rightward steering clutches 40L and 40R, final speed reducing units 50L and 50R and sprockets 60L and 60R.

It should be noted that an inertia brake 80 is arranged between the main clutch 20 and the transmission 30.

In addition, the construction machine includes a throttle lever 90, a leftward steering lever 100, a rightward steering lever 110, an inching lever 120, a left-hand brake lever 130 and a right-hand brake lever 140, and a plurality of actuation quantity detecting sensors 91, 101, 111, 121, 131 and 141 each adapted to output an electric signal in response to actuation of each of the aforementioned levers 90 to 140 are electrically connected to the levers 90 to 130.

For example, a potentiometer is employable for the aforementioned actuation quantity detecting sensors 91 to 141, and a series of detection signals are sequentially inputted into a controller 150.

Next, description will be made below as to a structure of the direct transmission 30 with reference to FIG. 3.

Figure 3:
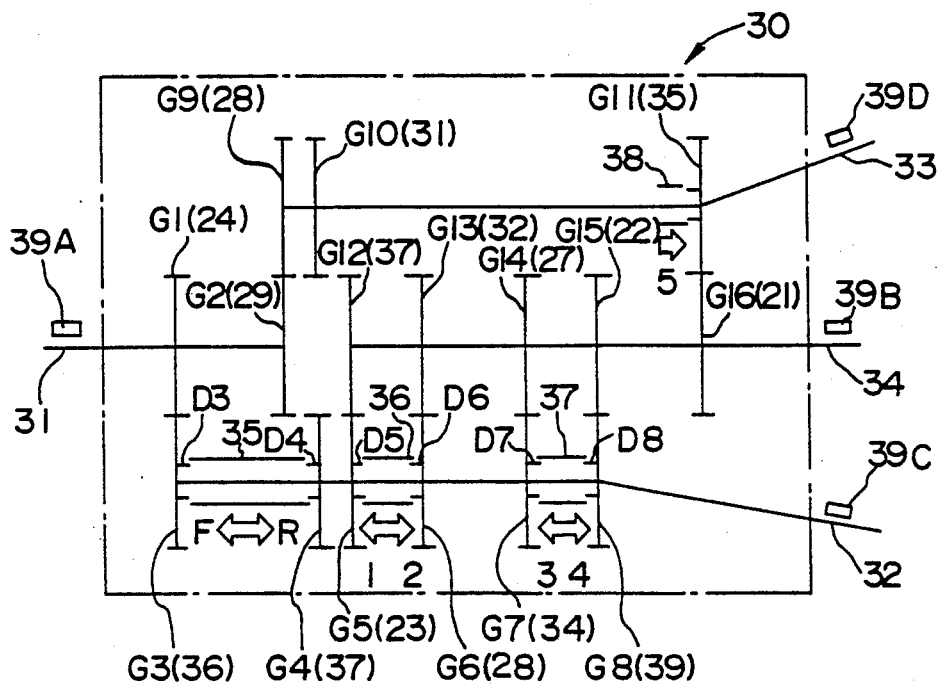
FIG. 3 is an illustrative view which schematically shows by way of example the structure of a direct transmission.

As shown in FIG. 3, the direct transmission 30 is constructed in the form of a normally meshing type transmission and includes an input shaft 31, an auxiliary shaft 32, an intermediate shaft 33 and an output shaft 34. Gears as noted below are mounted on the aforementioned shafts 31 to 34. Numerals in round brackets represent by way example the number of gear teeth, respectively.

Input Shaft 31 forward movement gear G1 (24)
rearward movement gear G2 (29)

Auxiliary Shaft 32 forward gear G3 (36)
rearward gear G4 (37)
first speed gear G5 (23)
second speed gear G6 (28)
third speed gear G7 (34)
fourth speed gear G8 (39)

Intermediate Shaft 33 rearward movement receiving gear G9 (28)
rearward movement back-up gear G10 (31)
fifth speed gear G11 (35)

Output Shaft 34 first speed gear G12 (37)
second speed gear G13 (32)
third speed gear G14 (27)
fourth speed gear G15 (22)
fifth speed gear G16 (21)

The gears G3 to G8 mounted on the auxiliary shaft 32 are rotatably fitted onto the auxiliary shaft 32, and dog dears D3 to D8 are integrally attached to the gears G3 to G8.

Additionally, a sleeve 35 selectively meshing with the dog gears D3 and D4, a sleeve 36 selectively meshing with the dogs D5 and D6 and a sleeve 37 selectively meshing with the dog gears D7 and D8 are mounted on the auxiliary shaft 32.

It should be noted that since the sleeve 35 to 37 are fitted into a plurality of splines on the peripheral surface of the auxiliary shaft 32, they are rotated together with the auxiliary shaft 32.

The gear G11 mounted on the intermediate shaft 33 is rotatably fitted onto the intermediate shaft 33 and includes a dog gear D11. A sleeve 38 adapted to mesh with the dog gear D11 is mounted on the intermediate shaft 33. It should be noted that since the sleeve 38 is fitted into a plurality of splines on the peripheral surface of the intermediate shaft 33, it is rotated together with the intermediate shaft 33.

The dog gear D3 and the sleeve 35 constitute a dog clutch for selecting forward movement, the dog gear D4 and the sleeve 35 constitute a dog clutch for selecting backward movement, the dog gear D5 and the sleeve 36 constitute a dog clutch for selecting first speed, the dog gear D5 and the sleeve 36 constitute a dog clutch for selecting second speed, the dog gear D7 and the sleeve 37 constitute a dog clutch for selecting third speed, the dog clutch D8 and the sleeve 37 constitute a dog clutch for selecting fourth speed, and the dog gear D11 and the sleeve 38 constitute a dog clutch for selecting fifth speed.

A speed changing operation is performed in the transmission 30 by selectively establishing an operative connection among the aforementioned dog clutches.

For example, when it is assumed that the sleeve 35 on the auxiliary shaft 32 meshes with the dog gear D3 and the sleeve 36 on the auxiliary shaft 32 meshes with the dog gear D6, a rotational force of the input shaft 31 is transmitted to the output shaft 34 via the gear G1, the gear G3, the gear G6 and the gear G13. At this time, the transmission 30 has selected a second speed (F2) for forward movement.

In this case, when a rotational speed of the input shaft 31 is identified by $N_{IN}$, a rotational speed of the output shaft 34 is represented in accordance with the following equation.

$$N_{OUT} = N_{IN} \times (24/36) \times (28/32) \qquad (1)$$

Positions to be occupied by the sleeves 35 to 38 are determined by selectively actuating a select actuator 170, a shift actuator 180 and a forward movement/rearward movement actuator 190, respectively.

For example, in a case where an operator selects second speed for forward movement as a speed stage, the forward movement/rearward movement actuator 190 is retracted to a F position whereby the sleeve 35 is displaced in the leftward direction to reach the position where the sleeve 35 meshes with the dog gear D3. After the select actuator 170 is fully expanded, the shift actuator 180 is retracted whereby the sleeve 36 is displaced in the rightward direction to reach the position where the sleeve 36 meshes with the dog gear D6.

It should be noted that the actuators 170, 180 and 190 are equipped with position detecting sensors 171, 181 and 191 each serving to detect the present operative position.

FIG. 2 is a flowchart which illustrates a concrete procedure employable for practicing the method of the present invention. The controller 150 executes the foregoing procedure.

According to this procedure, first, the controller 150 determines the kind of a speed changing operation to be performed. In other words, the controller 150 makes determination as to which one should be selected from among a shift-up speed changing operation, a shifting operation from forward movement to rearward movement and vice versa and a shift-down speed changing operation (step 500).

In response to output signals from the position detecting sensors 171, 180 and 190 attached to the actuators 170, 180 and 190, the controller 150 recognizes the present speed stage which has been selected in the transmission 30.

When a speed changing operation is to be performed, the operator actuates a speed stage indicator shown in FIG. 1. Specifically, the speed stage indicator 160 includes a plurality of push button switches for indicating speed stages F1 to F5 on the forward movement side, speed stages R1 to R4 on the rearward movement side and a neutral stage N, and the operator actuates one of the push button switches in correspondence to a required speed stage to be selected for performing a speed changing operation Then, the signal which has been outputted from the speed stage indicator 160 to indicate the required speed stage is inputted into the controller 150.

Now, it is supposed that the present speed stage which has been selected in &he transmission 30 is a second speed and the required speed stage which has been indicated by the speed stage indicator 160 is a third speed. In this case, at the step 500, the controller 150 determines that a shift-up speed changing operation should be performed.

When the controller 150 has determined at the step 500 that a shift-up speed changing operation should be performed, the steering clutches 40L and 40R are simultaneously released from their operative state thereof (step 501). This causes the transmission 30 to be operatively separated from the caterpillars 70L and 70R. As a result, the construction machine runs under the effect of an inertia.

Figure 5:
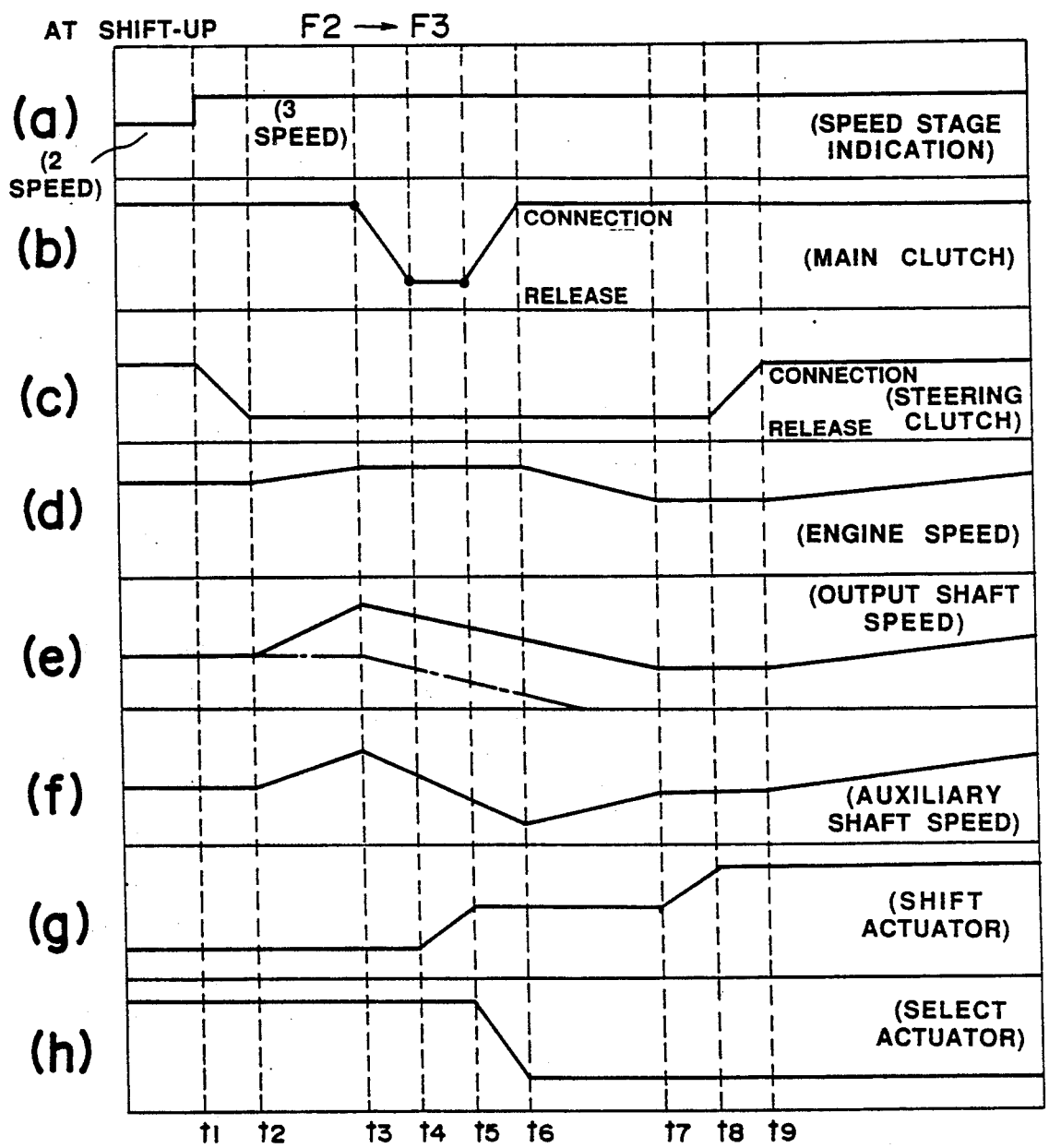
FIG. 5 shows a plurality of timing charts each of which illustrates a function of respective components when a shift-up speed changing operation is to be performed.

Here, FIG. 5(a) is a timing chart which shows that the time point when a third speed is indicated by the speed stage indicator 160 is identified by $t_1$. FIG. 5(c) is another timing chart which shows that a releasing operation for the steering clutches 40L and 40R is started at the time point $t_1$ and then completed at a time point $t_2$.

It should be noted that the releasing operation for the steering clutches 40L and 40R is performed by actuating hydraulic clutch actuating means 220L and 220R in response to the clutch releasing signal outputted from the controller 150.

The steering clutches 40L and 40R have a sensor (not shown) incorporated therein for confirming the present state of release or operative connection, respectively. At this time, the program goes to a step 502. At the step 502, the controller 150 determines in response to detection signals from the sensors whether the steering clutches 40L and 40R has been released from the operatively engaged state or not.

When the controller 150 confirms that the steering clutches 40L and 40R have been released from their operatively engaged state, the controller 150 detects the present rotational speed of the engine 10 in response to an output from the engine rotation sensor 15 (step 503). Subsequently, the controller 150 sets a target engine speed $N_1$ higher than the present engine speed with reference to the detected engine speed, the present speed stage (second speed) and the next speed stage, i.e., the required speed stage (third speed) (step 504).

Incidentally, the target engine speed $N_1$ will be described in more details later.

Here, means for controlling the rotational speed of the engine 10 will be described below with reference to FIG. 4.

As shown in the drawing, the engine 10 is equipped with a servo-actuator 13 for driving a control rack 12 for a fuel injection pump 11 and a position detecting sensor 14 for detecting the position of the control rack 12.

An output signal from the actuation quantity detecting sensor 91 operatively associated with the throttle lever 90 represents a target engine speed $N_0$ which is to be determined based on an operator's intention. As is apparent from the drawing, the output signal is transmitted to a subtractor 231 via a contact a in a shift switch 230.

The subtractor 231 calculates a deviation of the output signal from the sensor 91 from the output signal from the engine speed detecting sensor 15 which serves to indicate an actual engine speed $N_E$. The signal corresponding to the foregoing deviation is transformed into a rack position command signal in an amplifier 232 having a predetermined gain. Thereafter, the transformed signal is transmitted to a subtractor 233.

Then, the subtractor 233 calculates a deviation of the output signal from the amplifier 232 from the output signal from the rack position detecting sensor 14. The signal corresponding to the foregoing deviation is transmitted to the servo-actuator 13 via an amplifier 234.

Thereafter, the servo-actuator 13 controls the position of the control rack 12 so as to allow the engine 10 to be rotated at the target engine speed $N_0$.

Figure 4:
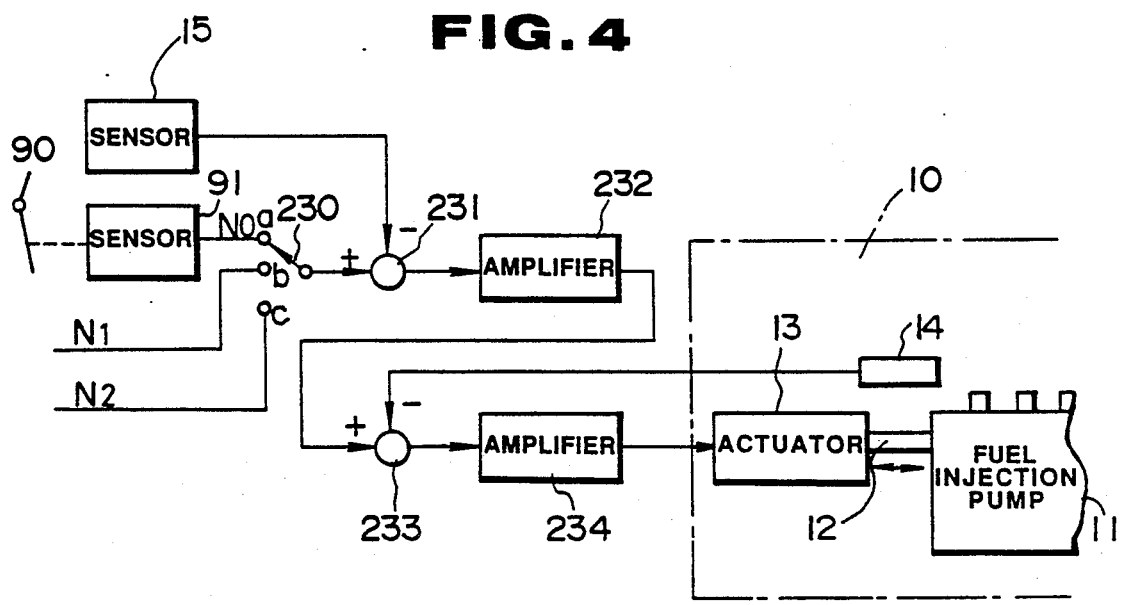
FIG. 4 is a block diagram which schematically shows by way of example the structure of controlling means for controlling an engine speed.

As will be apparent from the above description, the components 231 to 234 and the components 12 to 15 shown in FIG. 4 function as a component to be employed for an electronic type governor, respectively. It should be added that the components 230 and 234 are incorporated in the controller 150.

When the target engine speed $N_1$ has been set at the step 504, the program goes to a next step 505. At the step 505, the controller 150 executes a processing operation for rotating the engine 10 at the target engine speed $N_1$.

Specifically, the operator actuates the switch 230 so as to allow the contact a to be shifted to another contact b, and then the controller 150 executes a processing operation for allowing the engine speed command signal corresponding to the target engine speed $N_1$ to be inputted into the amplifier 232, whereby the engine speed is raised up to the engine speed $N_1$.

Here, FIG. 5(d) is a timing chart which shows that the engine speed has been increased to the engine speed $N_1$ within the time range of $t_2$ to $t_3$ and FIG. 5(e) is a timing chart which shows that the rotational speed of the output shaft 34 of the transmission 30 is increased as the engine speed is increased.

When the sensor 15 confirms that the engine speed is raised up to $N_1$ (step 506), the main clutch 20 is released from the operatively engaged state thereof (step 507).

It should be noted that a releasing operation for the main clutch 20 is performed by actuating hydraulic clutch driving means 210 in response to the clutch releasing signal outputted from the controller 150. After completion of the releasing operation for the main clutch 20, the respective shafts in the transmission 30 are rotated under the effect of their inertia.

Here, FIG. 5(b) is a timing chart which shows that the releasing operation for the main clutch 20 is started at a time point $t_3$ and then completed at a time point $t_4$. In addition, FIG. 4(e) is another timing chart which shows that the rotational speed of the output shaft 30 in the transmission 30 is gradually reduced from the time point $t_3$ when the releasing operation for the main clutch 20 is started.

When the sensor incorporated in the main clutch 20 confirms that the main clutch 20 has been released from the operatively engaged state (step 508), the controller 150 executes a processing operation for releasing the dog clutch corresponding to the present speed stage, i.e., a processing operation for actuating the shift actuator 180 shown in FIG. 1 to disengage the sleeve 36 from the dog gear D6 which has been selectively held in the second speed state (step 509). This processing operation is continuously performed until the controller 150 determines at a next stage 510 that the dog clutch has been released from the operatively engaged state thereof.

It should be noted that the determination at the step 510 is made in response to an output signal from the sensor 181 attached to the actuator 180.

Here, FIG. 5(g) is a timing chart which shows that the releasing operation for the dog clutch is started at a time point $t_4$ and then completed at a time point $t_5$.

When the controller 150 determines at the step 510 that the dog clutch has been released from the operatively engaged state, the controller 150 executes a processing operation for bringing the main clutch 20 in the operatively engaged state again, as shown in FIG. 5(b) (step 511). This processing operation is continuously performed until the controller 150 determines at a next step 512 that the operative engagement of the main clutch 20 has been completed. As is apparent from the drawing, the operative engagement of the main clutch 20 is completed at a time point $t_6$.

As shown in FIG. 5(h), the select actuator 170 is retracted to the intermediate position thereof within the range of the time point $t_5$ to the time point $t_6$.

Subsequently, the program goes to a next step 513. At the step 513, the present rotational speed $N_{OUT}$ of the output shaft 34 in the transmission 30 is detected by the sensor 39. Thereafter, the controller 150 calculates the target engine speed $N_2$ so as to allow the rotational speed of the dog gear D7 to coincide with the rotational speed of the sleeve 37, i.e., to allow the dog gear D7 to mesh with the sleeve 37 in synchronization with each other (step 514).

Specifically, at the step 514, the controller 150 executes a processing operation for calculating the target engine speed $N_2$ with reference to the rotational speed $N_{OUT}$ and the number of gear teeth of the respective gears G14, G7, G3 and G1 in accordance with the following equation (2).

$$N_2 = N_{OUT} \times (27/34) \times (36/24) \qquad (2)$$

When the target engine speed N2 has been calculated, the program goes to a next step 515. At the step 515, the controller 150 executes a processing operation for rotating the engine 10 at the target engine speed $N_2$.

Specifically, the operator actuates the switch 230 shown in FIG. 4 so as to allow the contact b to be shifted to another contact c, and then the controller 150 executes a processing operation for allowing the engine speed command signal corresponding to the target engine speed $N_2$ to be inputted into the amplifier 232, whereby the engine speed is set to $N_2$. It should be added that the time point when the engine speed $N_2$ has been set in that way is identified by $t_7$ in FIG. 5.

While the engine speed is held at the target engine speed $N_2$, the rotational speed of the dog gear D7 constituting a dog clutch for selecting third speed coincides with the rotational speed of the sleeve 37. Then, the program goes to a next step 516. At the step 516, the controller 150 executes a processing operation for allowing the dog gear D7 to mesh with the sleeve 37, i.e., a processing operation for allowing the dog clutch for selecting third speed to be brought in synchronous meshing engagement.

The processing operation for the foregoing meshing engagement is performed by expansively actuating the shift actuator 180 shown in FIG. 1. Referring to FIG. 5(g), the time point when the actuator 180 starts the expansive actuation is identified by $t_7$, while the time point when the actuator 180 completes the same is identified by $t_8$.

Then, the program goes to a step 517. At the step 517, the controller 150 determines in response to an output signal from the sensor 181 whether the shifting operation has been completed by actuating the actuator 180 or not, i.e., whether the speed stage has been changed to third speed or not. In a case where the result derived from the determination is YES, the controller 150 executes a processing operation for bringing the steering clutches 40L and 40R in the operatively engaged state (step 518).

Subsequently, the program goes to a next step 519. When the controller 150 determines at the step 519 that the steering clutches 40L and 40R have been brought in the operatively engaged state, the engine 10 is rotated at the engine speed which has been designated by the throttle lever 90 (step 520).

Specifically, the operator actuates the switch 230 shown in FIG. 4 so as to allow the contact c to be shifted to the contact and then the controller 150 executes a processing operation for allowing the engine speed command signal corresponding to the target engine speed $N_0$ to be inputted into the amplifier 232, whereby the engine 10 is rotated at the target engine speed $N_0$. Thereafter, the construction machine runs forwardly at the third speed.

As shown in FIG. 5(c), the steering clutches 40L and 40R have been brought in the operatively connected state at a time point $t_9$.

As described above, while the program remains at the step 505, the engine 10 is rotated at the engine speed $N_1$ higher than the target engine speed $N_0$ at the time point when the steering clutches 40L and 40R are released from the operatively engaged state. This is attributable to the reason as mentioned below.

Now, it is supposed that the main clutch 20 is released from the operatively engaged state at the step 507 while the engine speed is maintained at the target engine speed $N_0$. In this case, the rotational speed of the output shaft 34 in the transmission 30 is reduced within a very short period of time, as represented by an one dot-chain line in FIG. 5(e). As a result, the rotational speed $N_{OUT}$ of the output shaft 34 detected at the step 513 is very largely reduced. In some case, it may be reduced to a level of zero.

In the aforementioned case where the rotational speed $N_{OUT}$ is very largely reduced, another target engine speed $N_2$ calculated in accordance with the equation (2) is reduced lower than an idling engine speed. Additionally, in the case where the engine speed $N_{OUT}$ is reduced to a level of zero, the target engine speed $N_2$ is also reduced to a level of zero.

In the case where the target engine speed $N_2$ is set to a very low level in the above-described manner, it becomes impossible for the controller 150 to properly control the engine speed at the step 515. This is because a functional trouble such as engine stop or the like occurs with the engine 10.

The reason for increasing of the engine speed at the step 505 consists in avoidance of an occurrence of the aforementioned malfunction.

It should be noted that the target engine speed $N_1$ to be set at the step 504 can adequately be determined depending on the engine speed at the time point when the steering clutches 40L and 40R are released from their operatively engaged state, the speed stage prior to the speed changing operation and the next speed stage (required speed stage).

According to the shown embodiment, the target engine speed $N_1$ adaptably corresponding to various kind of example of combination among the engine speed, the speed stage prior to the speed changing operation and the next speed stage is previously stored in storing means. Then, the controller 150 sets the target engine speed $N_1$ based on the engine speed detected during the actual speed changing operation, the speed stage prior to the speed changing operation (present speed stage), the next speed stage and the content of items stored in the storing means.

According to this embodiment, since a shift-up speed changing operation is carried out while the steering clutches 40L and 40R are released from the operatively engaged state, the present invention offers an advantageous effect that running of the construction machine is not interrupted by any means.

In addition, since a dog gear constituting a dog clutch meshes with a sleeve in synchronization with each other, a speed changing operation can be performed out very smoothly.

Figure 2A:
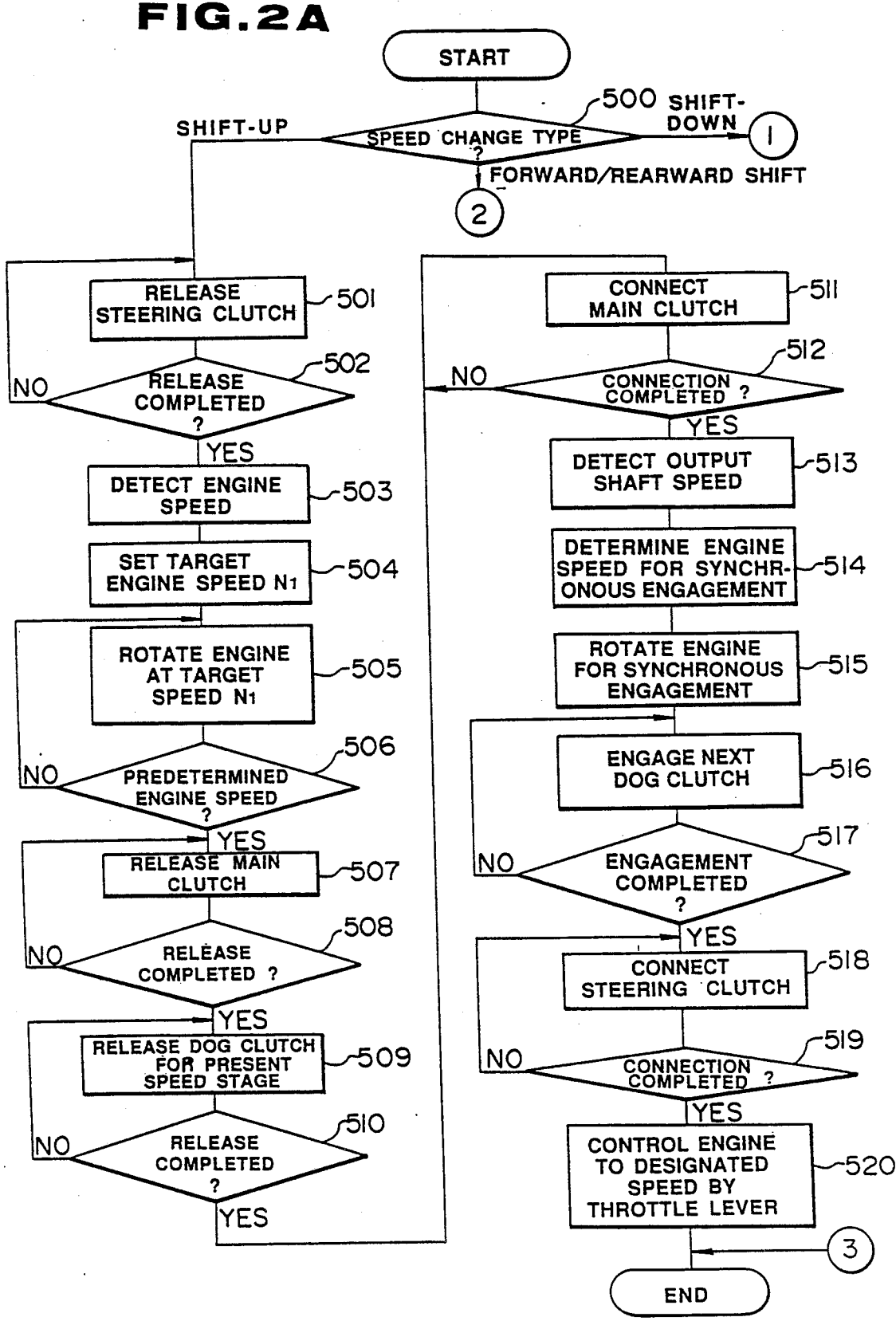
FIG. 2A is a flowchart which shows a procedure of performing a series of processing operations when a shift-up speed changing operation is to be performed.

Next, description will be made below as to a case where the controller 150 has determined a shift-down speed changing operation to be carried out at the step 500 in FIG. 2A.

Figure 2B:
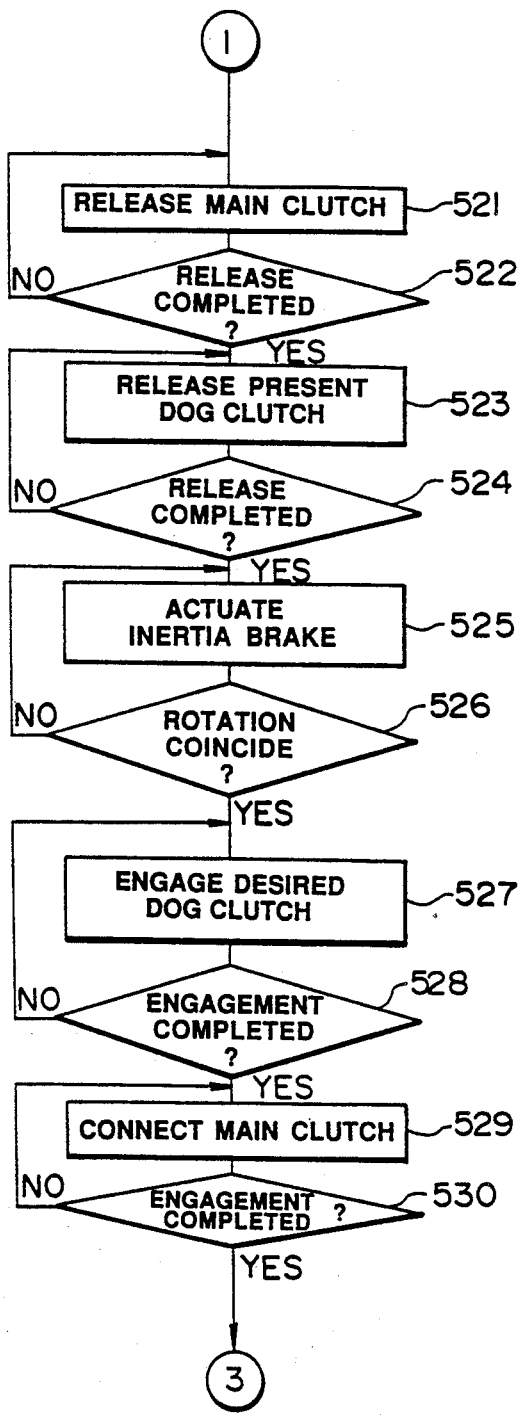
FIG. 2B is a flowchart which shows a procedure for performing a series of processing operations when a shift-down speed changing operation is to be performed.

In this case, first, the controller 150 executes a processing operation for releasing the main clutch 20 from the operatively engaged state (step 521), as shown in FIG. 2B. Subsequently, the controller 150 confirms that the main clutch 20 has been fully released from the operatively engaged state (step 522).

Then, the program goes to a next step 523. At the step 523, the controller 150 executes a processing operation for releasing the dog clutch at the present speed stage from the operatively engaged state. For example, a case where a shift-down speed changing operation is performed so as to shift the present third speed down to a second speed is taken in consideration. At the step 523, the controller 150 actuates the shift actuator 180 shown in FIG. 1 so as to allow the sleeve 37 to be disengaged from the dog gear D7 for the third speed shown in FIG. 3.

Subsequently, the program goes to a step 524. When the controller 150 confirms at the step 524 that the dog clutch at the present speed stage has been released from the operatively engaged state, the inertia brake 80 is actuated so as to allow the input shaft 31 in the transmission 30 to be braked (step 525).

Once the input shaft 31 has been braked, the rotational speed of the auxiliary shaft 32 is reduced, whereby the rotational speed of the sleeve 36 comes near to the rotational speed of the dog gear D6 for the second speed more and more.

Then, the program goes to a step 526. At the step 526, in response to output signals from an output shaft rotation sensor 39B and an auxiliary shaft rotation sensor 39C, the controller 150 makes determination with reference to the number of gear teeth of the gears G6 and G13 as to whether the rotational speed of the sleeve 36 coincides with the rotational speed of the dog gear D6 or not. When the controller 150 determines that the both rotational speeds coincide with each other, the select actuator 170 and the shift actuator 180 are actuated so as to allow the sleeve 36 to mesh with the dog gear D6 (step 527).

Subsequently, the program goes to a step 528. When the controller 150 determines at the step 528 that the foregoing meshing engagement has been completed, i.e., the shift-down speed changing operation to the required speed state (second speed) has been completed, the controller 150 executes a processing operation for bringing the main clutch 20 in the operatively engaged state (step 529). This processing operation is continuously performed until the controller 150 determines at a step 530 that the main clutch 20 has been brought in the operatively engaged state.

Next, a case where the main controller 150 determines that forward movement/rearward movement shift should be carried out at the step 500 in FIG. 2A will be described below.

Figure 2C:
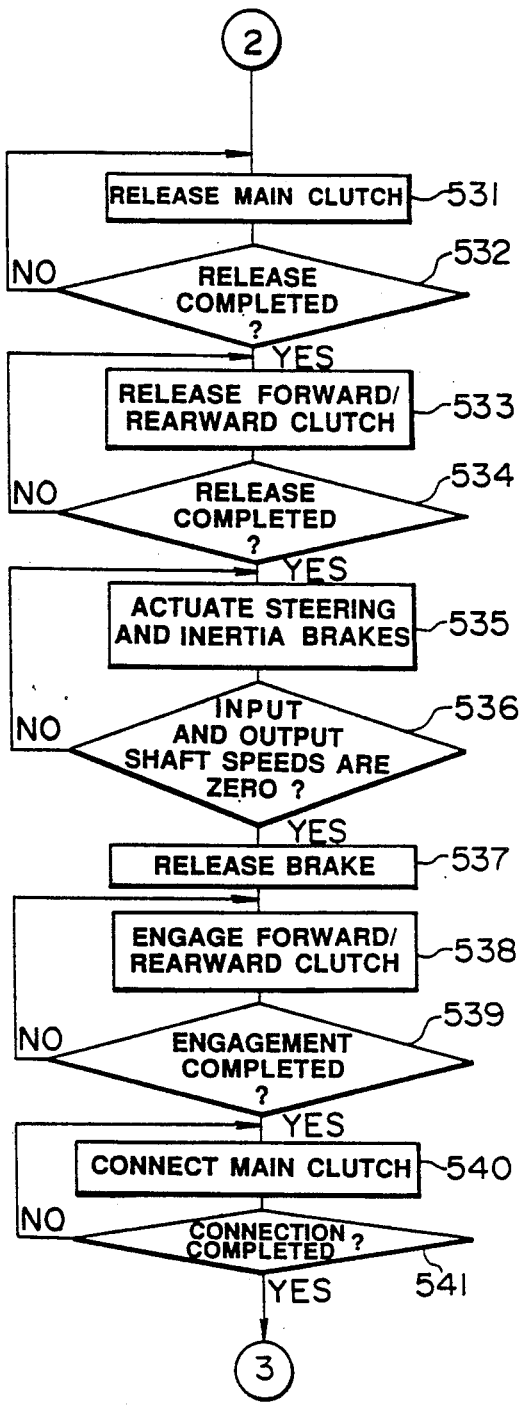
FIG. 2C is a flowchart which shows a procedure for performing a series of processing operations when forward movement is shifted to rearward movement and vice versa.

In this case, first, the main controller 150 executes a processing operation for releasing the main clutch 20 from the operatively engaged state thereof, as shown in FIG. 2C (step 531). Subsequently, the controller 150 confirms that the main clutch 20 has been released from the operatively engaged state (step 532).

The program goes to a next step 533. At the step 533, the controller 150 executes a processing operation for releasing the dog clutch for forward movement/rearward movement from the operatively engaged state thereof. Specifically, the actuator 190 shown in FIG. 1 is actuated so as to allow the dog gear D3 for third speed shown in FIG. 3 to be disengaged from the sleeve 35.

Then, the program goes to a step 534. When the controller 150 confirms at the step 534 that the dog clutch D3 has been disengaged from the sleeve 35, steering brakes 41L and 41R arranged by the steering clutches 40L and 40R as well as the inertia brake 80 are actuated to brake the output shaft 34 and the input shaft 31 in the transmission 30 (step 535).

Subsequently, the program goes to a next step 536. At the step 536, the controller 150 determines whether rotation of the input shaft 31 and rotation of the output shaft 34 are interrupted or not. In a case where the result derived from the determination at the step 536 is YES, the both steering brakes 41L and 41R are released from the operatively engaged state thereof (step 637). It should be added that running of the construction machine is stopped at the time point when it has been found that the result derived from the determination at the step 536 is YES.

Then, the program goes to a step 538. At the step 538, the controller 150 executes a processing operation for bringing the dog clutch for forward movement/rearward movement in the operatively engaged state. Specifically, the controller 150 executes a processing operation for allowing the sleeve 35 to mesh with the dog gear D4 for rearward movement shown in FIG. 3 by actuating the actuator 190.

When the controller 150 determines at a step 539 that the sleeve 35 has meshed with the dog gear D4, the controller 150 executes a processing operation for bringing the main clutch 20 in the operatively engaged state again (step 540). The foregoing processing operation is continuously be performed until the controller 150 determines at a step 541 that the operatively engaged state has been reached.

Since FIG. 3 is a developed drawing, the gear G4 for rearward movement mounted on the auxiliary shaft 32 and the rearward movement back-up gear G10 mounted on the intermediate shaft 33 are illustrated in the drawing such that they are spaced away from each other. In practice, the both gears G4 and G10 normally mesh with each other. Thus, when the sleeve 35 meshes with the dog gear D4 at the step 538, rotation of the input shaft 31 is transmitted to the auxiliary shaft 32 via the gears G2, G9, G10 and G4. It should be noted that the direction of rotation of the auxiliary shaft 32 at this time is inverse to that in the case where the sleeve 35 meshes with the dog gear D3.

According to the above-described embodiment, the leftward steering lever 100 and the rightward steering lever 110 are practically used when the leftward steering clutch 40L and the rightward steering clutch 40R are actuated manually, and the inching lever 120 is practically used when an inching operation is manually performed for actuating the main clutch 20. In addition, the left-hand brake lever 130 and the right-hand brake lever 140 are practically used when the leftward steering brake 41L and the rightward steering brake 41R are actuated with an operator's foot.

Referring to FIG. 1 again, an indicator 151 is electrically connected to the controller 150 in order to indicate a number of necessary data such as the present speed stage, the present vehicle speed and others on a display board thereof.

Finally, it should be noted that the present invention is applicable to other construction machines rather than the bulldozer, provided that these construction machines are a caterpillar drive type construction machine including a direct transmission, respectively.

Industrial Applicability

As is apparent from the above description, the method of the present invention of controlling a speed changing operation for a construction machine can be practiced such that a shift-up speed changing operation is smoothly performed particularly for a caterpillar drive type construction machine including a direct transmission without any necessity for interrupting movement of the construction machine. Consequently, the method of the present invention is advantageously employable for the purpose of improving workability of the construction machine and moreover alleviating a load to be borne by an operator in charge of speed changing operations.

We claim:

1. A method of controlling a speed changing operation, said method being preferably employable for a construction machine including a direct transmission adapted to select a speed stage by actuating a dog clutch as well as left-hand and right-hand caterpillars to which power generated in an engine is transmitted via a main clutch, said direct transmission and leftward and rightward steering clutches, wherein said method is practiced by way of the following steps particularly when a shift-up speed changing operation is to be performed;
   a step of releasing said leftward and rightward steering clutches from the operatively engaged state thereof,
   a step of increasing an engine speed,
   a step of releasing said main clutch from the operatively engaged state thereof,
   a step of releasing said dog clutch which has selected the present speed stage from the meshing engagement thereof,
   a step of bringing the main clutch in the operatively engaged state,
   a step of detecting the rotational speed of an output shaft in said transmission,
   a step of setting a target engine speed for realizing synchronous operative engagement with a dog clutch for a next speed stage based on the rotational speed of the output shaft and the number of gear teeth to be brought in meshing engagement when it is assumed that the next speed stage has been selected,
   a step of rotating the engine at said target engine speed,
   a step of bringing the dog clutch for the next speed stage in the operatively engaged state thereof,
   a step of bringing the leftward and rightward steering clutches in the operatively engaged state, and
   a step of rotating the engine at the engine speed which has been designated by actuating a throttle lever.

2. A method of controlling a speed changing operation for a construction machine as claimed in claim 1, wherein the target engine speed at the step of increasing the engine speed is set with reference to the engine speed at the time point when the steering clutches are released from the operatively engaged state, the present speed stage and the next speed stage such that the target engine speed indicates an optimum value at which a proper operation of the engine is not obstructed by any means.

3. A method of controlling a speed changing operation for a construction machine as claimed in claim 2, wherein the target engine speed to be reached at the step of increasing the engine speed is previously stored in storing means corresponding to the engine speed at the time point when the steering clutches are released from the operatively engaged state, the present speed stage and the next speed stage.

* * * * *